(12) United States Patent
Webster (10) Patent No.: US 12,509,031 B2
(45) Date of Patent: Dec. 30, 2025

(54) METHODS AND SYSTEMS FOR ELECTRIC PARK BRAKE ACTIVATION BASED ON A TIRE CHANGE

(71) Applicant: GM GLOBAL TECHNOLOGY OPERATIONS LLC, Detroit, MI (US)

(72) Inventor: James A. Webster, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 18/418,679

(22) Filed: Jan. 22, 2024

(65) Prior Publication Data

US 2025/0236271 A1   Jul. 24, 2025

(51) Int. Cl.
   *B60T 7/12*   (2006.01)

(52) U.S. Cl.
   CPC ............. *B60T 7/12* (2013.01); *B60T 2240/03* (2013.01)

(58) Field of Classification Search
   CPC ................................. B60T 7/12; B60T 2240/03
   See application file for complete search history.

(56) References Cited

U.S. PATENT DOCUMENTS

| | | | | |
|---|---|---|---|---|
| 4,678,017 A * | 7/1987 | Schultz | ............. | B60C 23/00363 137/859 |
| 4,754,792 A * | 7/1988 | Braun | ............... | B60C 23/00363 152/416 |
| 4,860,579 A * | 8/1989 | Beverly | ............. | B60C 23/00354 152/416 |
| 4,883,105 A * | 11/1989 | Schultz | ............. | B60C 23/00363 137/859 |
| 4,924,926 A * | 5/1990 | Schultz | ............. | B60C 23/00354 137/625.2 |
| 5,180,456 A * | 1/1993 | Schultz | ............. | B60C 23/00372 152/416 |
| 5,249,609 A * | 10/1993 | Walker | ............. | B60C 23/00372 141/38 |
| 5,263,524 A * | 11/1993 | Boardman | ........ | B60C 23/00354 152/416 |
| 5,516,379 A * | 5/1996 | Schultz | ............. | B60C 23/00363 702/140 |
| 5,524,481 A * | 6/1996 | Claussen | ........... | B60C 23/00354 152/416 |
| 5,674,332 A * | 10/1997 | Battocchio | ........ | B60C 23/00372 152/416 |
| 6,098,682 A * | 8/2000 | Kis | .................... | B60C 23/00372 137/224 |
| 6,561,017 B1 * | 5/2003 | Claussen | ........... | B60C 23/00318 73/146 |

(Continued)

FOREIGN PATENT DOCUMENTS

| | | | | | |
|---|---|---|---|---|---|
| CN | 113022233 A | * | 6/2021 | .......... | B60C 23/003 |
| DE | 102013113685 A1 | | 11/2014 | | |

(Continued)

*Primary Examiner* — Joseph J Dallo
(74) *Attorney, Agent, or Firm* — Ingrassia Fisher & Lorenz, LLP | IF&L (57) ABSTRACT

Methods and systems are provided for controlling a park brake of a vehicle. In one embodiment, a method includes: evaluating tire pressure data associated with at least one tire of the vehicle; and in response to the evaluating, selectively generating a park brake control signal to activate the park brake of the vehicle.

20 Claims, 3 Drawing Sheets

(56) References Cited

U.S. PATENT DOCUMENTS

| | | | | |
|---|---|---|---|---|
| 6,894,607 B1* | 5/2005 | Claussen | ........... | B60C 23/00372 137/225 |
| 7,273,082 B2* | 9/2007 | White | ............... | B60C 23/00372 152/417 |
| 7,437,920 B2* | 10/2008 | Beverly | ............ | B60C 23/00354 152/417 |
| 7,530,379 B1* | 5/2009 | Becker | ............. | B60C 23/00318 152/416 |
| 7,669,465 B2* | 3/2010 | Becker | ............. | B60C 23/00318 152/417 |
| 8,136,561 B2* | 3/2012 | Sandoni | ........... | B60C 23/00372 152/416 |
| 8,245,746 B2* | 8/2012 | Stanczak | ................ | F04B 41/02 152/417 |
| 8,505,600 B2* | 8/2013 | Padula | ............. | B60C 23/00327 152/417 |
| 8,973,633 B2* | 3/2015 | Wilson | ............. | B60C 23/00372 152/415 |
| 9,694,630 B2* | 7/2017 | Kona | ....................... | B60C 29/02 |
| 10,611,198 B2* | 4/2020 | Toth | .................... | B60C 23/0479 |
| 11,707,949 B2* | 7/2023 | Morris | ............. | B60C 23/00354 152/417 |
| 2006/0180256 A1* | 8/2006 | Mittal | .................. | B60C 23/004 152/416 |
| 2009/0314590 A1* | 12/2009 | Dagh | ....................... | B60T 7/12 188/110 |
| 2015/0136270 A1* | 5/2015 | Keane | ............... | B60C 23/00354 141/38 |
| 2015/0144222 A1* | 5/2015 | Wilson | ............. | B60C 23/00354 141/66 |

FOREIGN PATENT DOCUMENTS

| | | |
|---|---|---|
| DE | 102022124291 A1 | 4/2023 |
| JP | 2014076269 A * | 5/2014 |

* cited by examiner

METHODS AND SYSTEMS FOR ELECTRIC PARK BRAKE ACTIVATION BASED ON A TIRE CHANGE

INTRODUCTION

The technical field generally relates to vehicles and, more specifically, to methods and systems for electrically actuating a park brake based upon a tire change event.

Vehicles are equipped with a park brake, also known as a hand brake or an emergency brake, which secures the vehicle in a motionless state while in a park. The park brake typically includes a braking system that secures two wheels, for example the rear wheels.

During a tire change, for example, when a tire is flat, it is generally recommended to engage the park brake when hoisting the vehicle. In such an event, the park brake is manually engaged by the user of the vehicle. Some users may forget to engage the park brake.

Accordingly, it is desirable to provide methods and systems for electrically actuating the park brake based upon a detected tire change event. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for controlling a park brake of a vehicle. In one embodiment, a method includes: evaluating tire pressure data associated with at least one tire of the vehicle; and in response to the evaluating, selectively generating a park brake control signal to activate the park brake of the vehicle.

In various embodiments, the evaluating includes determining whether the tire pressure data indicates that a tire pressure is low for the at least one tire of the vehicle, and when the tire pressure data indicates that the tire pressure is low for the at least one tire of the vehicle, the selectively generating comprises generating the park brake control signal to activate the park brake.

In various embodiments, the evaluating includes comparing the tire pressure data to a threshold tire pressure to determine that a tire pressure is low for the at least one tire of the vehicle, and when the tire pressure is determined to be low, the selectively generating comprises generating the park brake control signal to activate the park brake.

In various embodiments, the method further includes evaluating transmission range data associated with a transmission of the vehicle, and wherein the selectively generating is further in response to the evaluating the transmission range data.

In various embodiments, wherein the evaluating includes determining that a transmission range is park based on the transmission range data, and wherein the selectively generating comprises generating the park brake control signal to activate the park brake.

In various embodiments, the evaluating includes determining that the transmission range transitions out of park based on the transmission range data, and wherein the selectively generating comprises generating the park brake control signal to deactivate the park brake.

In various embodiments, the method includes evaluating park brake status data associated with the park brake of the vehicle, and selectively generating a notification control signal to a notification device that notifies a user of the vehicle of the activation of the park brake.

In another embodiment, a system includes: a computer readable medium configured to store tire pressure data associated with at least one tire of the vehicle; and a computer system onboard the vehicle and configured to, by a processor: evaluate the tire pressure data associated with the at least one tire of the vehicle; and in response to the evaluating, selectively generate a park brake control signal to activate the park brake of the vehicle.

In various embodiments, the computer system is configured to evaluate by determining whether the tire pressure data indicates that a tire pressure is low for the at least one tire of the vehicle, and when the tire pressure data indicates that the tire pressure is low for the at least one tire of the vehicle, the computer system is configured to selectively generates the park brake control signal to activate the park brake.

In various embodiments, the computer system is configured to evaluate by comparing the tire pressure data to a threshold tire pressure to determine that a tire pressure is low for the at least one tire of the vehicle, and when the tire pressure is determined to be low, the computer system selectively generates the park brake control signal to activate the park brake.

In various embodiments, the computer system is further configured to evaluate transmission range data associated with a transmission of the vehicle, and wherein the computer system selectively generates further in response to the evaluating the transmission range data.

In various embodiments, the computer system is configured to evaluate by determining that a transmission range is park based on the transmission range data, and the computer system selectively generates the park brake control signal to activate the park brake.

In various embodiments, the computer system is configured to evaluate by determining that a transmission range is transition out of park based on the transmission range data, and the computer system selectively generates the park brake control signal to deactivate the park brake.

In various embodiments, the computer system is further configured to evaluate park brake status data associated with the park brake of the vehicle, and selectively generate a notification control signal to a notification device that notifies a user of the vehicle of the activation of the park brake.

In another embodiment, a vehicle includes: a park brake system comprising a park brake configured to be electrically activated; and a controller comprising: a computer readable medium configured to store tire pressure data associated with at least one tire of the vehicle; and a processor. The processor is configured to evaluate the tire pressure data associated with the at least one tire of the vehicle; and in response to the evaluating, selectively generate a park brake control signal to activate the park brake of the vehicle.

In various embodiments, the controller is configured to evaluate by determining whether the tire pressure data indicates that a tire pressure is low for the at least one tire of the vehicle, and when the tire pressure data indicates that the tire pressure is low for the at least one tire of the vehicle, the processor is configured to selectively generates the park brake control signal to activate the park brake.

In various embodiments, the processor is configured to evaluate by comparing the tire pressure data to a threshold tire pressure to determine that a tire pressure is low for the at least one tire of the vehicle, and when the tire pressure is determined to be low, the processor selectively generates the park brake control signal to activate the park brake.

In various embodiments, the controller is further configured to evaluate transmission range data associated with a transmission of the vehicle, and wherein the processor selectively generates further in response to the evaluating the transmission range data.

In various embodiments, the processor is configured to evaluate by determining that a transmission range is park based on the transmission range data, and the processor selectively generates the park brake control signal to activate the park brake.

In various embodiments, the processor is configured to evaluate by determining that a transmission range is transition out of park based on the transmission range data, and the processor selectively generates the park brake control signal to deactivate the park brake.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
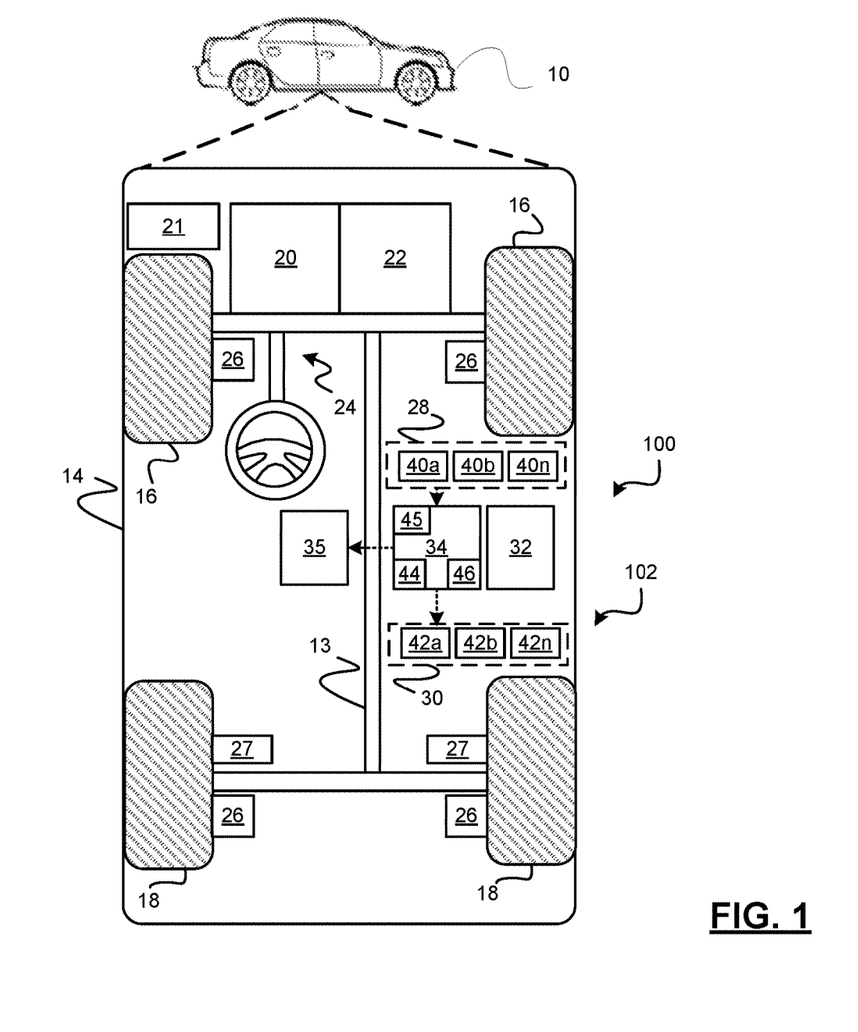
FIG. 1 is a functional block diagram of a vehicle that includes a park brake activation system for providing electric activation of a park brake, in accordance with various embodiments.

With reference to FIG. 1, a park brake activation system shown generally at 100 is associated with a vehicle 10 equipped with a park brake system 102 in accordance with various embodiments. As will be discussed in more detail herein, the park brake control system 100 electrically activates one or more park brakes of the park brake system based on a detection of a tire change event. As will be discussed in more detail herein, the tire change event is detected based on a tire pressure determined to be low.

In various embodiments, the vehicle 10 comprises an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms having a park brake system and is not limited to an automobile.

As depicted in FIG. 1, the exemplary vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 near a respective corner of the body 14 and may each include a tire.

The vehicle 10 generally includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The park brake system 102 is configured to provide braking torque to a least two of the vehicle wheels 16-18, for example the rear wheels 18, when the vehicle 10 is in park, for example, to hold the vehicle 10 motionless. The park brake system 102 may, in various embodiments, include the brakes of the brake system 26 and/or separate park brakes 27 configured to provide the park brake function. For exemplary purposes, the park brake system 102 will be discussed in the context of the embodiment having separate park brakes 27.

The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle 10 and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, speed sensors, and/or other sensors. In various embodiments, the sensor system 28 includes one or more tire pressure sensors configured to sense a pressure of the tires associated with the wheels 16-18.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). In various embodiments, the actuator system 30 includes actuator devices of the park brake system 102 that are configured to activate and deactivate the park brakes 27.

The data storage device 32 stores data for use in controlling the vehicle 10. In various embodiments, the data storage device 32 stores defined values for controlling the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the park brake control system 100 and, when executed by the processor 44, receive data from the sensor system 28 and process the data in order to generate control signals to the park brake system 102 to electrically activate the park brake and/or provide notification of the park brake activation based upon a detected tire change event.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
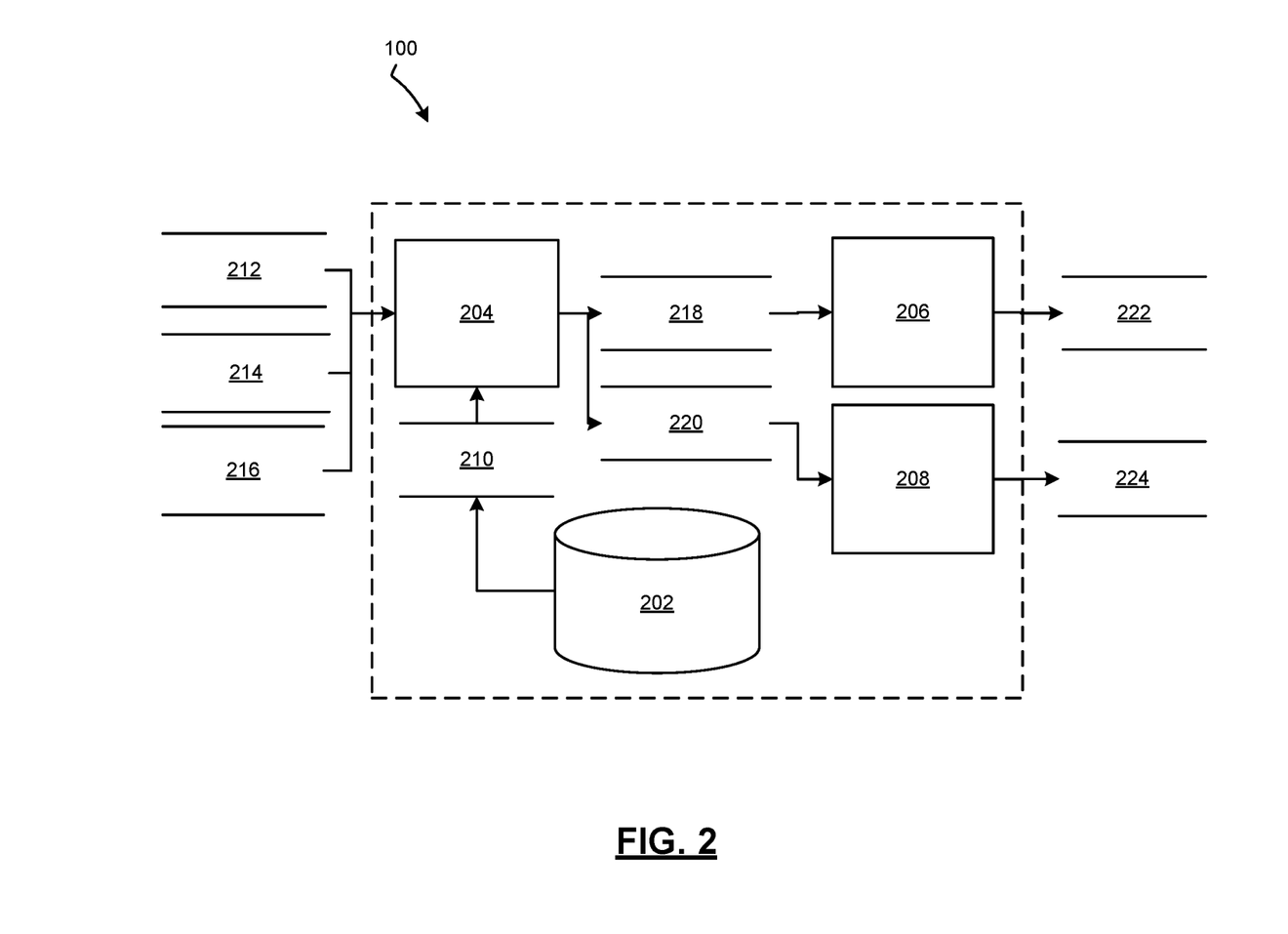
FIG. 2 is a dataflow diagram illustrating the park brake activation system of the vehicle of FIG. 1, in accordance with various embodiments.

With reference to FIG. 2 and with continued reference to FIG. 1, a dataflow diagram illustrates elements of the park brake control system 100 of FIG. 1 in accordance with various embodiments. As can be appreciated, various embodiments of the park brake control system 100 according to the present disclosure may include any number of modules embedded within the controller 34 which may be combined and/or further partitioned to similarly implement systems and methods described herein. Furthermore, inputs to the park brake control system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the park brake control system 100 includes a parameter data datastore 202, an enablement module 204, a park brake control module 206, and a notification control module 208.

In various embodiments, the parameter data datastore 202 stores parameter data 210 associated with the tires of the vehicle 10. For example, the parameter data datastore 202 stores threshold data for determining when a tire pressure of the tires of the vehicle 10 is low. For example, the parameter data can include a recommended tire pressure for each tire, a threshold percent of the recommended pressure for each tire, a vehicle speed to monitor the tire pressure at, and/or a threshold duration for monitoring the tire pressure. As can be appreciated, other parameters that can be used to evaluate the tire pressure of the tires of the vehicle can be stored in various embodiments.

In various embodiments, the enablement module 204 receives as input transmission range data 212, tire pressure data 214, and park brake status data 216. In various embodiments, the transmission range data 212 indicates a range (e.g., park, reverse, neutral, etc.) or gear (e.g., park, first gear, second gear, etc.) of the transmission system 22. The enablement module 204 generates park brake enablement data 218 to enable activation or deactivation of the park brake based on whether the range is in park or transitioning from park. For example, when the range is in park, the park brake enablement module 204 sets the park brake enablement data 218 to indicate enable the park brake. In another example, when the range is transitioning from park to another gear or range, the park brake enablement module 204 sets the park brake enablement data 218 to indicate disable the park brake.

In various embodiments, the tire pressure data 214 indicates a status of the tire pressure, for example, such as normal or low. In various other embodiments the tire pressure data 214 includes data indicating a pressure of each of the tires of the vehicle 10 and/or other data used in determining whether the tire pressure is low. The enablement module 204 generates park brake enablement data 218 to enable activation of the park brake 27 based on whether a tire pressure of a tire is determined to be low based on, for example, the status received or a comparison of the tire pressure data 214 to the parameter data 210 stored in the parameter data datastore 202. For example, when at least one tire pressure is below a corresponding tire pressure threshold (e.g., that is percentage of the recommended tire pressure) while the vehicle velocity is above a threshold velocity for a defined duration, the tire pressure is determined to be low, and the park brake enablement module 204 sets the park brake enablement data 218 to indicate enable the park brake. In another example, when all of the tire pressures are determined to be not low, the park brake enablement module 204 sets the park brake enablement data 218 to indicate disable the park brake.

Figure 3:
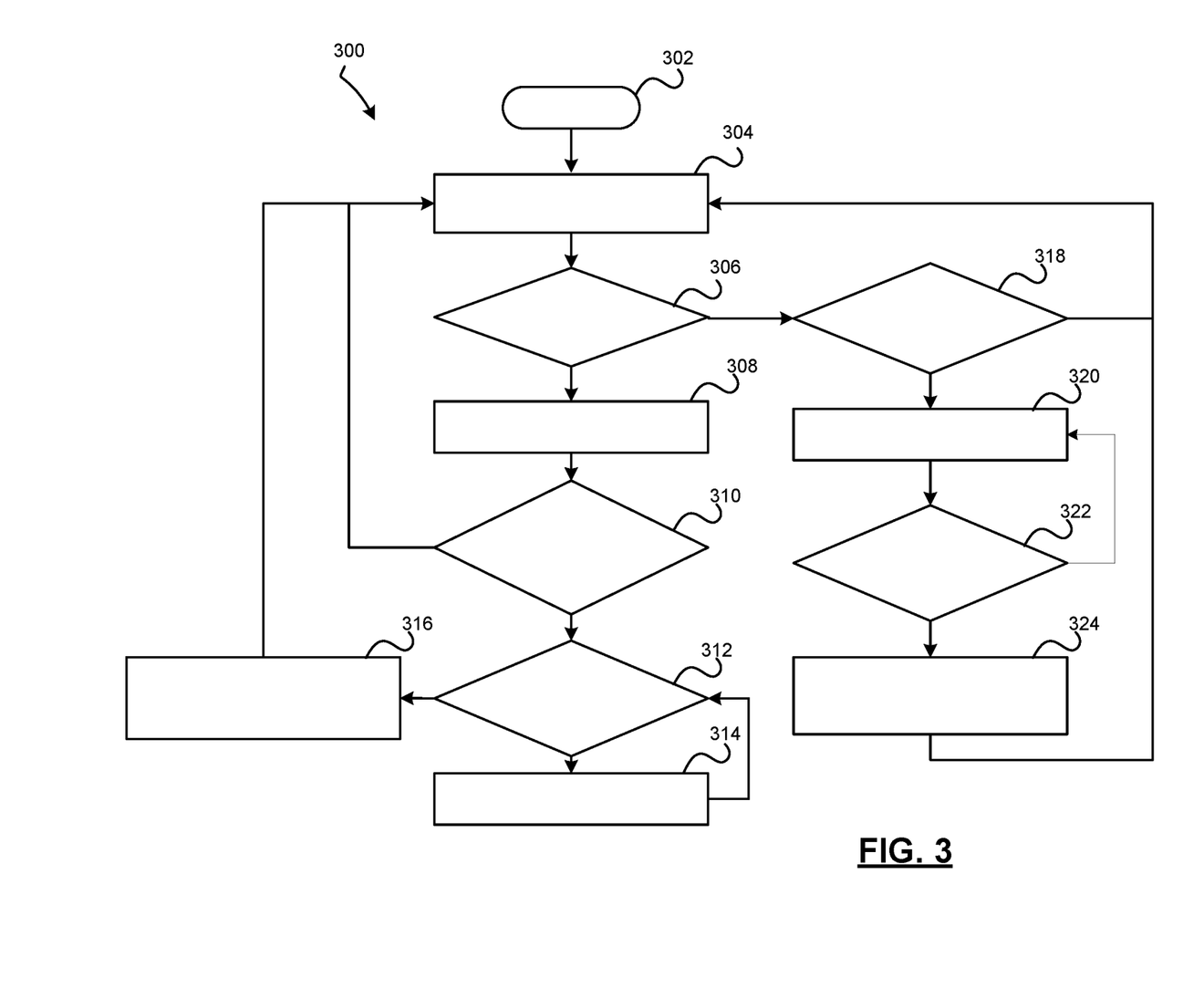
FIG. 3 is a flowchart of a process for providing electric activation of the park brake system, in accordance with exemplary embodiments.

As can be appreciated, in various embodiments, the conditions of the transmission range data 212 and the tire pressure data 214 can be evaluated in combination or separately in order to generate the park brake enablement data 218. FIG. 3 illustrates embodiments of the enablement conditions being implemented in combination.

The park brake status data 216 indicates the status of the park brake of the park brake system. The enablement module 204 generates notification enablement data 220 to enable activation of the notification device based on whether the park brake status indicates the park brake is engaged or disengaged. For example, when the park brake status data 216 indicates that the park brake 27 is engaged, the park brake enablement module 204 sets the notification enablement data 220 to indicate enable the notification. In another example, when the park brake status data 216 indicates that the park brake 27 is not engaged, the park brake enablement module 204 sets the notification enablement data 220 to indicate disable the notification.

As can be appreciated, in various embodiments, the conditions of the transmission range data 212, the tire pressure data 214, and the park brake status data 216 can be evaluated in combination or separately in order to generate the notification enablement data 220. FIG. 3 illustrate embodiments of the enablement conditions being implemented in combination.

In various embodiments, the park brake control module 206 receives as input the park brake enablement data 218. Based on the park brake enablement data 218, the park brake control module 206 selectively generates park brake signal data 222 to electrically activate or deactivate the park brake system. For example, when the park brake enablement data 218 indicates to enable the park brake, the park brake control module 206 generates park brake signal data 222 to enable the notification. In another example, when the park brake enablement data 218 indicates to disable the park brake, the park brake control module 206 generates park brake signal data 222 to disable the notification.

In various embodiments, the notification control module 208 receives as input the notification enablement data 220. Based on the notification enablement data 220, the notification control module 208 selectively generates notification signal data 224 to notify a user of the activation or deactivation of the park brake. For example, when the notification enablement data 220 indicates to enable the notification, the notification control module 208 generates notification signal data 224 to notify the user that the park brake is engaged (e.g., by illuminating a light, activating a sound, displaying a message, etc.). In another example, when the notification enablement data 220 indicates to disable the notification, the notification control module 208 generates notification signal data 224 to notify the user that the park brake is disengaged (e.g., by turning off the light, activating another sound, displaying a message, etc.).

With reference now to FIG. 3 and with continued reference to FIGS. 1 and 2, a flowchart is provided of a method 300 for providing electric activation of a park brake based upon a tire change event as performed by the park brake control system 100, in accordance with exemplary embodiments. As can be appreciated in light of the disclosure, the order of operation within the method 300 is not limited to the sequential execution as illustrated in FIG. 3 but may be performed in one or more varying orders as applicable and in accordance with the present disclosure. In various embodiments, the method 300 can be scheduled to run based on one or more predetermined events, and/or can run continuously during operation of the vehicle 10.

As can be appreciated, the various parameters are pre-stored in the parameter data datastore 202, for example, based upon the while the vehicle 10.

In one example, the method 300 may begin at 302. The range or gear data is received at 304. It is determined whether the transmission range is park at 306. If the transmission range is park at 306, the tire pressure data is received at 308 and evaluated to determine whether the tire pressure is low, by for example, comparing with the parameter data 210 stored in the parameter data datastore 202 at 310.

For example, if the tire pressure is determined to be low for at least one of the tires at 306, it is determined whether the park brake is engaged at 312. If the park brake is not engaged at 312, a park brake activation signal is generated at 314 to electrically activate the park brake of the park brake system 102.

Once it is determined that the park brake is engaged at 312, a notification signal is generated to notify a user of the activation of the park brake at 316. Thereafter, the method 300 continues with receiving and monitoring the range data at 304 and 306.

When it is determined that the vehicle 10 is not operating in park at 306, it is determined whether the vehicle 10 is transitioning out of park at 318. If the vehicle 10 is transitioning out of park at 318, control signals are generated to deactivate the park brake at 320. Once it is confirmed that the park brake is disengaged at 322, a notification signal is generated to notify the user that the park brake is deactivated at 324. Thereafter, the method 300 continues with receiving and monitoring the range data at 304 and 306.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing controlling a park brake of a vehicle having a transmission, the method comprising:
    evaluating, by a controller, tire pressure data associated with at least one tire of the vehicle;
    determining, by the controller and based on the tire pressure data, whether a tire change event of the vehicle is detected based on a tire pressure determined to be below a threshold pressure;
    determining, by the controller, whether the transmission is in a park state;
    generating, by the controller and when the transmission is in the park state, a park brake enablement signal;
    in response to the tire change event being detected and the park brake enablement signal, selectively generating, by the controller, a park brake control signal to activate the park brake of the vehicle;
    electrically actuating, in response to the park brake control signal, the park brake;
    holding, by the park brake, the vehicle during the tire change event; and
    releasing, by the controller, the park brake when the transmission is shifted out of the park state.

2. The method of claim 1, wherein when the tire pressure data indicates that the tire pressure is determined to be not below the threshold pressure for all tires, setting, by a park brake enablement module of the controller, the park brake enablement signal to disable the park brake.

3. The method of claim 1, wherein the evaluating the tire pressure data includes evaluating threshold data for determining when the tire pressure of the tires of the vehicle is below the threshold pressure by using parameter data obtained by: evaluating the tire pressure for each tire based on a threshold percent of a recommended tire pressure for each tire; monitoring the tire pressure at a predetermined vehicle speed; and monitoring the tire pressure for a threshold duration.

4. The method of claim 1, wherein the determining whether the transmission is in the park state is completed after completing the determining whether the tire change event of the vehicle is detected.

5. The method of claim 1, comprising continuously monitoring, by the controller, range data of the transmission, and evaluating whether the transmission is transitioning out of the park state; and disabling the park brake when the transmission is transitioning out of the park state.

6. The method of claim 1, comprising carrying out by the controller together in combination, the evaluating the tire pressure data and the determining whether the transmission is in the park state.

7. The method of claim 1, further comprising evaluating park brake status data associated with the park brake of the vehicle, and selectively generating a notification control signal to a notification device that notifies a user of the vehicle of the activation of the park brake.

8. A system for controlling a park brake of a vehicle having a transmission, comprising:
    a computer readable medium configured to store tire pressure data associated with at least one tire of the vehicle; and
    a computer system onboard the vehicle and configured to, by a processor:
        evaluate the tire pressure data associated with the at least one tire of the vehicle;
        determine, based on the tire pressure data, whether a tire change event of the vehicle is detected based on a tire pressure determined to be below a threshold pressure;
        determine whether the transmission is in a park state;
        generate, when the transmission is in the park state, a park brake enablement signal;
        in response to the tire change event being detected and the park brake enablement signal, selectively generate a park brake control signal to activate the park brake of the vehicle;
        electrically actuate, in response to the park brake control signal, the park brake;
        maintain a hold, by the park brake, the vehicle during the tire change event; and
        release the park brake when the transmission is shifted out of the park state.

9. The system of claim 8, wherein the computer system is configured to set, by a park brake enablement module and when the tire pressure data indicates that the tire pressure is determined to be not below the threshold pressure for all tires, the park brake enablement signal to disable the park brake.

10. The system of claim 8, wherein the computer system is configured to evaluate threshold data for determining when the tire pressure of the tires of the vehicle is below the threshold pressure by using parameter data obtained by the computer system being configured to: evaluate the tire pressure for each tire based on a threshold percent of a recommended tire pressure for each tire; monitor the tire pressure at a predetermined vehicle speed; and monitor the tire pressure for a threshold duration.

11. The system of claim 8, wherein the determine whether the transmission is in the park state is completed by the computer system after completing the determine whether the tire change event of the vehicle is detected.

12. The system of claim 8, wherein the computer system is configured to continuously monitor range data of the transmission, and evaluate whether the transmission is transitioning out of the park state; and disable the park brake when the transmission is transitioning out of the park state.

13. The system of claim 8, wherein the computer system is configured to carry out together in combination, the evaluate the tire pressure data and the determine whether the transmission is in the park state.

14. The system of claim 8, further comprising evaluating park brake status data associated with the park brake of the vehicle, and selectively generating a notification control signal to a notification device that notifies a user of the vehicle of the activation of the park brake.

15. A vehicle, comprising:
a transmission having a park state;
a park brake system comprising a park brake configured to be electrically activated;
a controller comprising:
a computer readable medium configured to store tire pressure data associated with at least one tire of the vehicle;
and a processor, configured to:
evaluate the tire pressure data associated with the at least one tire of the vehicle;
determine, based on the tire pressure data, whether a tire change event of the vehicle is detected based on a tire pressure determined to be below a threshold pressure;
determine whether the transmission is in a park state;
generate, when the transmission is in the park state, a park brake enablement signal;
in response to the tire change event being detected and the park brake enablement signal, selectively generate a park brake control signal to activate the park brake of the vehicle;
electrically actuate, in response to the park brake control signal, the park brake;
effect hold, by the park brake, of the vehicle during the tire change event; and
release the park brake when the transmission is shifted out of the park state.

16. The vehicle of claim 15, wherein the controller is configured to set, by a park brake enablement module and when the tire pressure data indicates that the tire pressure is determined to be not below the threshold pressure for all tires, the park brake enablement signal to disable the park brake.

17. The vehicle of claim 15, wherein the controller is configured to evaluate threshold data for determining when the tire pressure of the tires of the vehicle is below the threshold pressure by using parameter data obtained by the controller being configured to: evaluate the tire pressure for each tire based on a threshold percent of a recommended tire pressure for each tire; monitor the tire pressure at a predetermined vehicle speed; and monitor the tire pressure for a threshold duration.

18. The vehicle of claim 15, wherein the determine whether the transmission is in the park state is completed by the controller after completing the determine whether the tire change event of the vehicle is detected.

19. The vehicle of claim 15, wherein the controller is configured to continuously monitor range data of the transmission, and evaluate whether the transmission is transitioning out of the park state; and disable the park brake when the transmission is transitioning out of the park state.

20. The vehicle of claim 15, wherein the controller is configured to carry out together in combination, the evaluate the tire pressure data and the determine whether the transmission is in the park state.

* * * * *